(12) United States Patent
Stiendl et al.

(10) Patent No.: US 11,352,938 B2
(45) Date of Patent: Jun. 7, 2022

(54) HYBRID VEHICLE WITH A REFUELING DEVICE

(71) Applicant: MAGNA Energy Storage Systems GesmbH, Sinabelkirchen (AT)

(72) Inventors: Gregor Stiendl, St. Ruprecht (AT); Manuel Bauer, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 0 days.

(21) Appl. No.: 17/366,598

(22) Filed: Jul. 2, 2021

(65) Prior Publication Data

US 2022/0018277 A1 Jan. 20, 2022

(30) Foreign Application Priority Data

Jul. 14, 2020 (EP) ..................................... 20185666

(51) Int. Cl.
| | | |
|---|---|---|
| *F01P 3/20* | (2006.01) | |
| *F01P 7/16* | (2006.01) | |
| *B60K 6/26* | (2007.10) | |
| *B60K 6/28* | (2007.10) | |
| *B60K 11/02* | (2006.01) | |
| *F02M 31/20* | (2006.01) | |

(52) U.S. Cl.
CPC .................. *F01P 3/20* (2013.01); *B60K 6/26* (2013.01); *B60K 6/28* (2013.01); *B60K 11/02* (2013.01); *F01P 7/165* (2013.01); *F02M 31/20* (2013.01); *F01P 2050/24* (2013.01); *F01P 2060/10* (2013.01)

(58) Field of Classification Search
CPC .......... F01P 3/20; F01P 7/165; F01P 2050/24; F01P 2060/10; B60K 6/26; B60K 6/28; B60K 11/02; F02M 31/20; F01M 31/205
See application file for complete search history.

(56) References Cited

U.S. PATENT DOCUMENTS

| | | | | |
|---|---|---|---|---|
| 5,263,462 A | * | 11/1993 | Reddy | ................ F02M 25/0809 |
| | | | | 123/198 D |
| 2019/0225110 A1 | * | 7/2019 | Zenner | ............... F02M 37/0076 |

FOREIGN PATENT DOCUMENTS

| | | |
|---|---|---|
| DE | 102010009875 A1 | 8/2011 |
| DE | 102016104820 A1 | 12/2016 |
| DE | 102019107041 A1 | 9/2019 |

* cited by examiner

*Primary Examiner* — Jacob M Amick
(74) *Attorney, Agent, or Firm* — Jordan IP Law, LLC; Todd A. Vaughn

(57) ABSTRACT

A hybrid vehicle having an electric drive with an energy storage device for the electric drive, and an internal combustion engine, and a tank device having a tank for storing fuel for the internal combustion engine. The hybrid vehicle further includes a cooling circuit, extending through the tank, having a circulating cooling medium to cool the energy storage device and also cool the fuel in the tank.

15 Claims, 1 Drawing Sheet

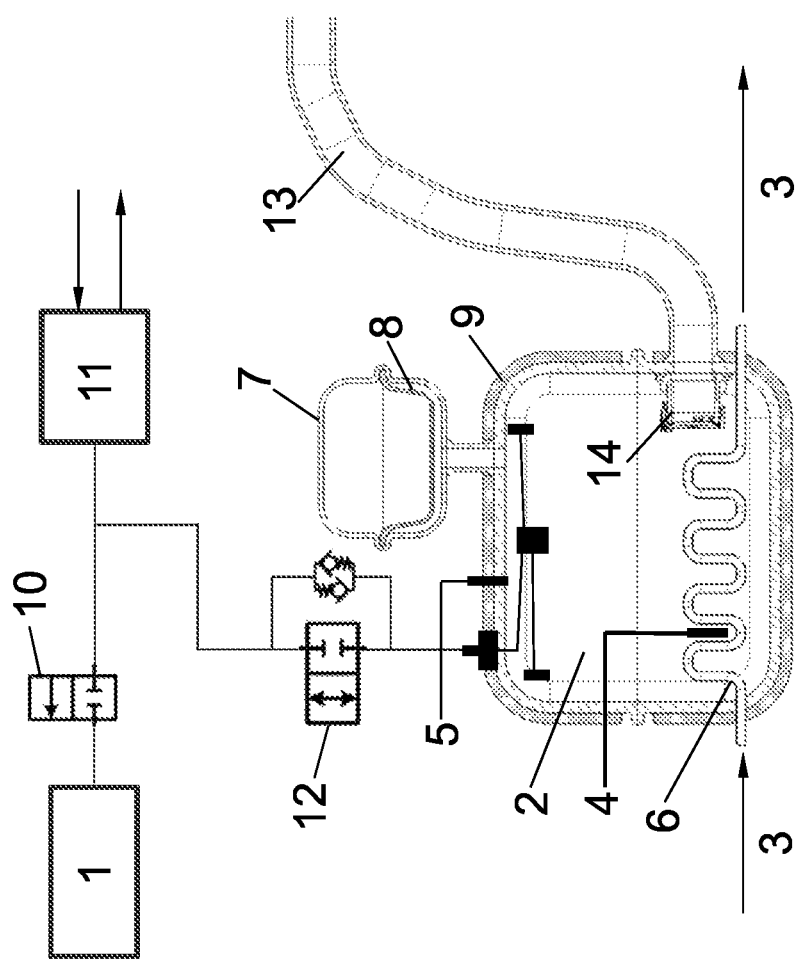

HYBRID VEHICLE WITH A REFUELING DEVICE

CROSS-REFERENCE TO RELATED APPLICATIONS

The present application claims priority under 35 U.S.C. § 119 to European Patent Publication No. EP 20185666.3 (filed on Jul. 14, 2020), which is hereby incorporated by reference in its complete entirety.

TECHNICAL FIELD

Embodiments relate to a hybrid vehicle having a tank device.

BACKGROUND

It is known that hybrid vehicles can comprise an electric drive and an internal combustion engine as an additional drive. The energy for the electric drive can be held ready in an energy storage device, i.e., in a battery or an accumulator. The fuel required for the internal combustion engine can be stored in a tank.

Particularly, in the case of hybrid vehicles, which can also be operated purely electrically, there is the problem that under certain circumstances the internal combustion engine and therefore the tank of the hybrid vehicle are not used for a long time. A fuel in the tank, even if it is not used, can continue to release gas and thus increase the pressure in the tank. In particular, if venting of such an unused tank is not possible, a high pressure, for example of more than 300 mbar, can build up in such a tank. The tank must then be designed to be correspondingly pressure-stable with suitable measures, such as reinforcements.

SUMMARY

Embodiments relate to a hybrid vehicle having a tank device to be operated purely electrically and for the tank to be protected at low cost against damage due to excess pressure.

In accordance with one or more embodiments, a hybrid vehicle having a tank device, the hybrid vehicle comprising: an electric drive with an energy storage device for the electric drive and an internal combustion engine; a fuel tank for storing the fuel for the internal combustion engine; a cooling circuit with a cooling medium circulating therethrough to cool the energy storage device, the cooling circuit extending through the tank to facilitate cooling of fuel in the tank by the cooling medium.

In accordance with one or more embodiments, the hybrid vehicle has a cooling circuit with a cooling medium circulating therethrough. The energy storage device, such as, for example, a battery, of the electric drive is cooled by the cooling circuit via the coolant cooling medium. The same cooling circuit which is configured for cooling the energy storage device of the electric drive is also used to cool the fuel stored in the fuel tank. The same cooling circuit therefore also extends through the tank, thus enabling the tank to be cooled by the cooling medium. This keeps the temperature in the fuel tank and, as a result, also facilitates a reduction in pressure in the tank. As a result, additional stiffening or reinforcements of the tank is not required, enabling the tank device to be manufactured at low cost.

In accordance with one or more embodiments, a cooling coil is arranged in the tank, and the cooling circuit extends through the cooling coil through the tank.

In accordance with one or more embodiments, the hybrid vehicle comprises a control unit to selectively control the cooling circuit by controlling flow of the cooling medium through the cooling circuit in the tank (including preventing flow of the cooling medium), with the result that the fuel in the tank is cooled (or not cooled) by the cooling medium in the cooling circuit. For this purpose, a valve is controlled by the control unit and, in particular, can be opened or closed or optionally partially opened in order to allow the cooling medium to flow through the tank (or prevent or otherwise reduce the flow of the cooling medium).

In accordance with one or more embodiments, a temperature sensor and/or a pressure sensor is arranged in the tank. The control unit is configured to control the cooling circuit by passing the cooling medium through the cooling circuit in the tank when the measured or detected temperature at the temperature sensor and/or the measured or detected pressure at the pressure sensor in each case exceed(s) predetermined limit values. It is thereby possible to cool the tank as required via the cooling circuit of the energy storage device.

In accordance with one or more embodiments, the cooling medium in the cooling circuit is cooled by a refrigerant circuit of an air-conditioning system, in particular, by a refrigerant-cooling medium heat exchanger (i.e., a so-called "chiller"). The refrigerant circuit comprises a refrigerant compressor that may also be operated when the internal combustion engine is not in operation.

In accordance with one or more embodiments, the tank has a pressure compensation vessel by which an excess pressure in the tank can be absorbed. The pressure compensation vessel is divided via a diaphragm into a first pressure compensation vessel region facing the tank and a second pressure compensation vessel region facing away from the tank. On the side of the diaphragm facing away from the tank, the pressure compensation vessel is subjected to pressure by a gas, such as, for example, nitrogen. The pressure on this side of the pressure compensation vessel corresponds at least to the hydrostatic pressure in the filling tube, i.e., to the result of the formula $\rho*g*h$, where h is the height of the filling tube, g is the gravitational acceleration of about 9.81 m/s$^2$ and $\rho$ is the density of the medium. With a filling tube height of 0.7 m and a density of 775 kg/m3 of petrol as the medium, this results in a pressure of at least 53.2 mbar, for example.

In accordance with one or more embodiments, the tank has insulation as a jacket in order to prevent heating of the tank contents by ambient heat.

In accordance with one or more embodiments, the energy storage device is cooled by the cooling circuit to a predetermined temperature value of approximately 15 to 35 degrees Celsius.

In accordance with one or more embodiments, the tank is arranged in the cooling circuit upstream or downstream of the refrigerant/cooling medium heat exchanger.

In accordance with one or more embodiments, the tank is connected to the atmosphere via a valve, in particular, a low-pressure valve. The valve is arranged upstream or downstream of an activated carbon filter, and is closed during purely electrical operation of the hybrid vehicle.

DRAWING

One or more embodiments will be illustrated by way of example in the drawings and explained in the description below.

FIG. 1 illustrates a schematic sectional view of a tank device of a hybrid vehicle, in accordance with one or more embodiments.

DESCRIPTION

FIG. 1 schematically illustrates components of a hybrid vehicle, such as, in particular, a tank device for the hybrid vehicle. The hybrid vehicle comprises an internal combustion engine 1, which can be supplied with fuel via a tank 2. The internal combustion engine 1 is connected to an activated carbon filter 11 via a scavenging valve 10. A low-pressure valve 12 is furthermore arranged between the activated carbon filter 11 and the tank 2.

A cooling coil 6 is arranged in the tank 2, and therefore, the cooling medium of a cooling circuit 3, shown schematically as arrows in FIG. 1, for cooling the energy storage device of the electric drive, also runs through the cooling coil 6, and thus, through the tank 2 in order to cool the tank 2. The tank 2 is filled via a filling tube 13, at the lower end of which an inlet non-return valve 14 is arranged.

The hybrid vehicle comprises a control unit (not illustrated) to selectively control the cooling circuit 3 by controlling flow of the cooling medium through the cooling circuit 3 in the tank 2 (including preventing flow of the cooling medium), with the result that the fuel in the tank 2 is cooled (or not cooled) by the cooling medium in the cooling circuit 3. The control unit is to facilitate selectively flow of the cooling medium through the cooling coil 6 in the tank 2 (or not), with the result that the fuel in the tank 2 is cooled (or not cooled) by the cooling medium in the cooling circuit 3. The control unit controls a suitable shut-off valve for this purpose.

A temperature sensor 4 is arranged in the tank 2 to detect or measure a temperature of the fuel in the tank 2. A pressure sensor 5 is also arranged in the tank 2 to detect or measure a pressure of inside of the tank 2 are arranged in the tank 2. The control unit is configured to pass the cooling medium through the cooling coil 6 in the tank 2 when the detected or measured temperature at the temperature sensor 4 and/or the detected or measured pressure at the pressure sensor 5 in each case exceed/s predetermined limit values.

The cooling medium in the cooling circuit 3 can be cooled by a refrigerant circuit, in particular, by a refrigerant-cooling medium heat exchanger, i.e., a so-called "chiller."

The tank 2 has a pressure compensation vessel 7 which is divided horizontally by a diaphragm 8, in particular by a bag diaphragm, into a first pressure compensation vessel region facing the tank 2 and a second pressure compensation vessel region facing away from the tank 2. On the side of the diaphragm 8 facing away from the tank 2, there is gaseous nitrogen ($N_2$), in the pressure compensation vessel 7, at a pressure of, for example, at least 40 mbar, depending on the height of the filling tube 13.

In addition, the tank 2 has insulation 9 as a jacket in order to prevent heating of the tank contents by ambient heat.

As a result of these measures, the tank is protected against the formation of an excess pressure by the release of gas from the fuel. Expensive reinforcement measures of the tank are therefore not necessary.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1 internal combustion engine
2 tank
3 cooling circuit
4 temperature sensor
5 pressure sensor
6 cooling coil
7 pressure compensation vessel
8 diaphragm
9 insulation
10 scavenging valve
11 activated carbon filter
12 low-pressure valve
13 filling tube
14 inlet non-return valve

What is claimed is:

1. A hybrid vehicle comprising:
an electric drive having an energy storage device;
an internal combustion engine;
a tank for storing fuel for the internal combustion engine;
a pressure compensation vessel fluidically connected to the tank; and
a cooling circuit, extending through the tank, having a circulating cooling medium to cool the energy storage device and the fuel in the tank.

2. The hybrid vehicle of claim 1, further comprising a control unit to control the cooling circuit by controlling flow of the cooling medium therethrough in a manner which selectively cools the fuel in the tank.

3. The hybrid vehicle of claim 2, further comprising a temperature sensor arranged in the tank to detect a temperature of the fuel in the tank.

4. The hybrid vehicle of claim 3, wherein the control unit is to control the cooling circuit by permitting controlling flow of the cooling medium therethrough when the detected temperature exceeds a predetermined threshold temperature value.

5. The hybrid vehicle of claim 2, further comprising a pressure sensor arranged in the tank to detect a pressure inside of the tank.

6. The hybrid vehicle of claim 5, wherein the control unit is to control the cooling circuit by permitting controlling flow of the cooling medium therethrough when the detected pressure exceeds a predetermined threshold pressure value.

7. The hybrid vehicle of claim 2, further comprising:
a temperature sensor arranged in the tank to detect a temperature of the fuel in the tank; and
a pressure sensor arranged in the tank to detect a pressure inside of the tank.

8. The hybrid vehicle of claim 7, wherein the control unit is to control the cooling circuit by permitting controlling flow of the cooling medium therethrough when:
the detected temperature exceeds a predetermined threshold temperature value, and the detected pressure exceeds a predetermined threshold pressure value.

9. The hybrid vehicle of claim 1, further comprising a refrigerant circuit to cool the cooling medium in the cooling circuit.

10. The hybrid vehicle of claim 9, wherein the refrigerant circuit comprises a refrigerant-cooling medium heat exchanger.

11. The hybrid vehicle of claim 1, further comprising a cooling coil arranged in the tank.

12. The hybrid vehicle of claim 11, wherein the cooling circuit runs through the cooling coil through the tank.

13. The hybrid vehicle of claim 1, further comprising an insulation layer surrounding the tank to serve as a jacket which prevents heating of contents in the tank by ambient heat.

14. A hybrid vehicle comprising:
- an energy storage device for an electric drive of the hybrid vehicle;
- a tank for storing fuel for an internal combustion engine of the hybrid vehicle;
- a pressure compensation vessel fluidically connected to the tank;
- a diaphragm to divide the pressure compensation vessel into a first pressure compensation vessel region facing the tank and a second pressure compensation vessel region facing away from the tank; and
- a cooling circuit, extending through the tank, having a circulating cooling medium to cool the energy storage device and the fuel in the tank.

15. A hybrid vehicle comprising:
- an energy storage device;
- a tank for storing fuel for an internal combustion engine of the hybrid vehicle;
- a filling tube operatively connected to the tank;
- a pressure compensation vessel fluidically connected to the tank;
- a diaphragm to divide the pressure compensation vessel into a first pressure compensation vessel region facing the tank and a second pressure compensation vessel region facing away from the tank, wherein the pressure compensation vessel is subjected to pressure on a side of the diaphragm facing away from the tank by a gas, the pressure corresponding at least to a hydrostatic pressure in the filling tube; and
- a cooling circuit, extending through the tank, having a circulating cooling medium to cool the energy storage device and the fuel in the tank.

\* \* \* \* \*